United States Patent [19]

Dreinhoff

[11] Patent Number: 4,834,557

[45] Date of Patent: May 30, 1989

[54] MOUNT FOR GUIDE ROLLER AT A CARRIER PART

[75] Inventor: Karl-Heinz Dreinhoff, Berlin, Fed. Rep. of Germany

[73] Assignee: Siemens Aktiengesellschaft, Munich, Fed. Rep. of Germany

[21] Appl. No.: 226,880

[22] Filed: Aug. 1, 1988

[30] Foreign Application Priority Data

Aug. 5, 1987 [DE] Fed. Rep. of Germany ... 8710848[U]

[51] Int. Cl.[4] ............................................. F16C 29/12
[52] U.S. Cl. ...................................... 384/54; 384/57; 384/58; 384/59
[58] Field of Search .................. 384/54, 57, 58, 59, 384/19, 55

[56] References Cited

U.S. PATENT DOCUMENTS

| | | | |
|---|---|---|---|
| 2,912,288 | 11/1959 | Griswold | 384/58 |
| 4,402,556 | 9/1983 | Schwind | 384/58 |
| 4,653,937 | 3/1987 | Laŭtenschläger | 384/57 |
| 4,737,039 | 4/1988 | Sekerich | 384/58 |

*Primary Examiner*—Lenard A. Footland

[57] ABSTRACT

In a mount for guide roller adjustable in axial direction relative to a carrier part, the mount comprising a bolt secured at one side to the carrier part and carrying the guide roller, the axial adjustability of the running roller or track roller is enabled without a subsequent actuation of securing elements for locking the running or track roller. To achieve this result, the bolt is firmly joined to the carrier part, the guide roller is rotatably seated on a threaded bush, the threaded bush is screwed onto the bolt provided with an outside thread, and a spring element annularly surrounding the bolt is clamped between the carrier part and the threaded bush.

6 Claims, 1 Drawing Sheet

MOUNT FOR GUIDE ROLLER AT A CARRIER PART

BACKGROUND OF THE INVENTION

The invention is directed to a mount for a guide roller adjustable in axial direction relative to a carrier part, comprising a pin secured at one side at the carrier part and carrying the guide roller.

In such a mount known from the book by F. Kotzer, "Bauelemente der Feinmechanik", 8th edition, 1959, VEB Verlag Technik Berlin, pages 208 through 210, a roller is seated in rotatable fashion on a pin or bolt secured at one side at a carrier part. In order to enable an axial displacement of the roller, the pin or bolt together with the roller it carries is held at the carrier part axially adjustable relative to the carrier part. To that end, the pin or bolt is either displaceably seated in a through hole of the carrier part and can be locked by a clamp screw or is provided with an outside thread and is screwed into a through hole of the carrier part having an inside thread, whereby the securing ensues with a counternut seated on the bolt or pin. As a consequence of the reaction of the securing elements (clamp screw or, respectively, counternut) on the bearing of the bolt or pin in the carrier part, a subsequent, undesired displacement of the pin or bolt in the axial direction is possible due to the actuation of the securing elements. This, however, is particularly disadvantageous when the roller has the function of a guide roller that is also to accept axial forces in addition to radial forces.

SUMMARY OF THE INVENTION

In a mount for a guide roller at a carrier part, an object of the invention is to enable an axial adjustability of the running roller or track roller relative to the carrier part without requiring a subsequent actuation of securing elements.

The stated object is achieved in accord with the invention in that the pin or bolt is rigidly joined to the carrier part. The guide roller is rotatably seated on a threaded bush. The threaded bush is screwed onto the bolt or pin provided with an outside thread, and a spring element annularly surrounding the bolt or pin is clamped between the carrier pair and the threaded bush.

A significant advantage of the guide roller mount of the invention is that the spring element effects a constant securing of the position of the guide roller in axial direction relative to the carrier part against unintentional maladjustment, so that securing elements that are to be additionally actuated can be omitted. The friction between the threaded bush, the spring element and the carrier part as well as the friction in the threaded generated by the spring power prevent the threaded bush from unscrewing from the bolt or pin given rotation of the guide roller. Added thereto is that, due to the spring power of the spring element acting opposite the screw-on direction of the threaded bush, a possible play in the thread between the threaded bush and the bolt or pin is supressed, even given alternating axial force stressing of the guide roller, so that the guide roller is seated play-free in axial direction relative to the carrier part because of the additionally firm joining of the bolt or pin to the carrier part. Within the framework of the invention, the bolt or pin can be optionally screwed or riveted to the carrier part.

In accord with a preferred development of the innovative mount, the bolt or pin is composed of a bearing journal that comprises a collar provided with an outside thread in the region of the connection of the bolt to the carrier part. The threaded bush comprises a sleeve part seated on the bearing journal and carrying the guide roller, the sleeve part being expanded at one end and, provided with an inside thread, being screwed on the collar of the bolt. Since the bearing journal carries the sleeve part of the threaded bush with the guide roller, nearly the entire radial force stress on the guide roller is absorbed by the bearing journal, so that, first, the thread between the threaded bush and the bolt is merely stressed in axial direction and, second, a play-free mounting of the guide roller relative to the carrier part is achieved in radial direction, particularly since the bolt is firmly joined to the carrier part. In order to increase the friction between the threaded bush, the spring element and the carrier part, this friction preventing the unintentional unscrewing of the threaded bush from the bolt, the threaded bush preferably comprises a flange in the region of its end face facing toward the carrier part. The spring element compressed between the flange and the carrier part thus lies against the flange of the threaded bush in a relatively large area fashion, so that high friction is produced.

As a consequence of its easy accessability from the outside, the flange of the threaded bush can also be advantageously used as an adjustment element for setting the axial distance of the guide roller relative to the carrier part. To this end, the flange is preferably fashioned as a knurled disk that can be manually actuated in an especially easy way or is fashioned as a hexagonal disk that can be set both manually as well as with a tool. Alternatively thereto, an adjustment of the threaded bush with a screwdriver is advantageously enabled in that the threaded bush was a slot at its end face facing away from the carrier part.

BRIEF DESCRIPTION OF THE DRAWINGS

The figures of the drawing shall be referred to below for explaining the invention. Shown therein are.

DESCRIPTION OF THE PREFERRED EMBODIMENTS

Figure 1:
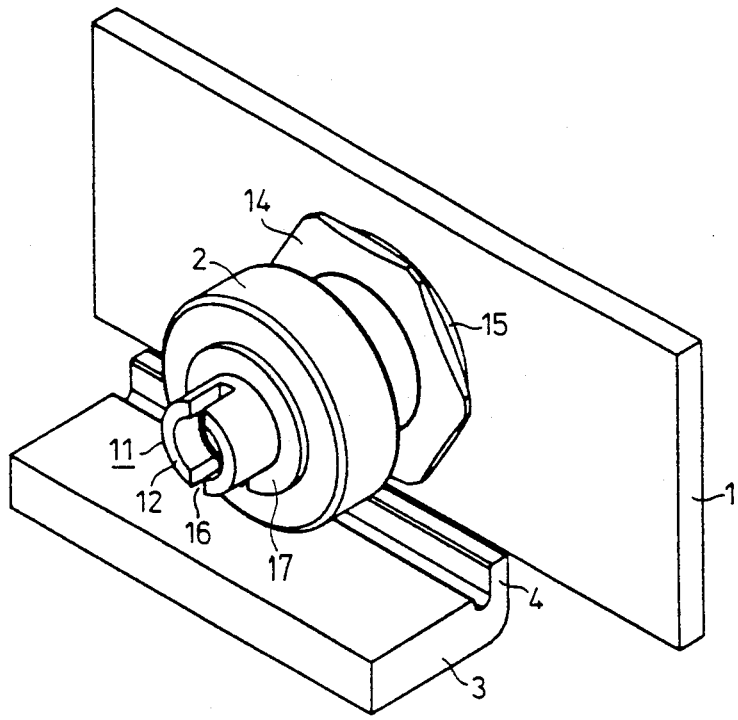
FIG. 1 is a perspective view of a preferred exemplary embodiment of the innovative mount for a guide roller.
Figure 2:
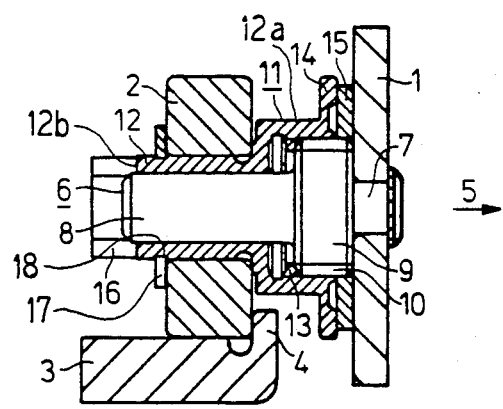
FIG. 2 is a section through the exemplary embodiment shown in FIG. 1.

FIGS. 1 and 2 show a carrier part 1 that is carried on a guideway 3 via a guide roller 2. The carrier part 2 is a framing part formed of sheet metal in an apparatus to be moved along the guideway 3, this apparatus not being shown here. Such an apparatus, for example, can be a scan carriage of an optical scanner means that it is to be displaced along the guideway relative to an original to be scanned, as forms the subject matter of the earlier German patent application bearing Ser. No. P 37 03 217.8. An exact guidance of the respective apparatus comprising the carrier part 1 along the guideway 3 is achieved in that the guideway 3 is laterally limited by a rim 4 against which the guide roller 2 is supported as a consequence of a force acting on the carrier part 1, this force being merely symbolized here by an arrow 5.

For the purpose of mounting the guide roller 2 at the carrier part 1, a bolt 6 is firmly joined to the carrier part 1 at one side by a riveted connection 7. That part of the bolt 6 projecting laterally away from the carrier part 1 is fashioned as a bearing journal 8 comprising a collar 9 adjoining the carrier part 1 and serving as a rivet head of the riveted connection 7. The collar 9 is provided with an outside thread 10. The guide roller 2 is freely rotatable, but is seated secure against displacement in axial direction on a threaded bush 11 that is screwed onto the bolt 6. To this end, the threaded bush 11 comprises a sleeve part 12 seated on the bearing journal 8, this sleeve part 12 being widened at one end 12a and being provided there with an inside thread 13 screwed onto the outside thread 10 of the collar 9. The outside thread 10 and the inside thread 13 are each a fine-pitch thread. The threaded sleeve 11 comprises a flange 14 at its end face facing toward the carrier part 1, an annular spring element 15 being inserted between said flange 14 and the carrier part 1. This spring element 15 can be optionally designed as a spring washer or as an elastic ring. The flange 14 is fashioned in the form of a hexagonal screw, so that a rotation of the threaded bush 11 on the bolt 6 can be undertaken either manually or with the assistance of a wrench in order to change the distance of the guide roller 2 from the carrier part 1. In this context, the flange can also be fashioned as a knurled disk. A slot 16 is contained in that end face of the threaded bush 6 facing away from the carrier part 1 in order to provide a further adjustment possibility of the threaded bush 11 with the assistance of a screwdriver. The roller 2 is held on the sleeve part 12 in one axial direction by the widened end 12a and at an opposite end 12b by means of a split ring washer 17 which is captured in a groove 18 in the sleeve part 12.

As a consequence of the mount of the guide roller 2 shown in FIGS. 1 and 2, all forces acting radially on the guide roller 2 are essentially absorbed by the bearing journal 8 of the bolt 6 without the threads 10 and 13 being stressed. Forces that act in the axial direction of the guide roller 2 are absorbed by the threads 10, 13, whereby the spring power of the spring element 15 supresses a possible play in the threads 10 and 13 even given alternating, axial force stressing of the guide roller 2. An axial adjustment of the spacing of the guide roller 2 relative to the carrier part 1 ensues by turning the threaded bush 11, whereby an unintentional unscrewing of the threaded bush 11 from the bolt 6 is prevented by friction between the flange 14 of the threaded bush 11, the spring element 15 and the carrier part 1 as well as by the friction in the threads 10 and 13 produced as a consequence of the spring power.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A mount for a guide roller adjustable in axial direction relative to a carrier part, comprising a bolt secured at one side to the carrier part and carrying the guide roller, comprising said bolt being rigidly joined to said carrier part; said guide roller being rotatably seated on a threaded bush; said threaded bush being screwed onto said bolt provided with an outside thread; and a spring element annularly surrounding said bolt being clamped between said carrier part and said threaded bush.

2. A mount according to claim 1, wherein said bolt is composed of a bearing journal that comprises a collar provided with said outside thread in the region of the connection of said bolt to said carrier part; and said threaded bush comprises a sleeve part seated on said bearing journal and carrying said guide roller, said sleeve part being widened at one end and, provided with an inside thread, being screwed on said collar of said bolt.

3. A mount according to claim 1, wherein said threaded bush comprises a flange in the region of its end face facing toward said carrier part.

4. A mount according to claim 3, wherein said flange is fashioned as a knurled disk.

5. A mount according to claim 3, wherein said flange is fashioned as an hexagonal disk.

6. A mount according to claim 1, wherein said threaded bush comprises a slot at its end face facing away from said carrier part.

* * * * *